(12) United States Patent
Vakilimoghaddam et al.

(10) Patent No.: US 11,629,917 B2
(45) Date of Patent: Apr. 18, 2023

(54) THREE-LAYER HEAT EXCHANGER WITH INTERNAL MANIFOLD FOR BATTERY THERMAL MANAGEMENT

(71) Applicant: Dana Canada Corporation, Oakville (CA)

(72) Inventors: Farbod Vakilimoghaddam, Mississauga (CA); Nikola Vucenic, Hamilton (CA); Kenneth M. A. Abels, Oakville (CA); Benjamin A. Kenney, Toronto (CA)

(73) Assignee: Dana Canada Corporation, Oakville (CA)

( * ) Notice: Subject to any disclaimer, the term of this patent is extended or adjusted under 35 U.S.C. 154(b) by 49 days.

(21) Appl. No.: 16/932,571

(22) Filed: Jul. 17, 2020

(65) Prior Publication Data
US 2021/0025655 A1    Jan. 28, 2021

Related U.S. Application Data

(60) Provisional application No. 62/877,652, filed on Jul. 23, 2019.

(51) Int. Cl.
| | | |
|---|---|---|
| *F28D 1/03* | (2006.01) | |
| *F28D 9/00* | (2006.01) | |
| *F28F 3/04* | (2006.01) | |

(52) U.S. Cl.
CPC ........... *F28D 1/0333* (2013.01); *F28D 9/005* (2013.01); *F28F 3/046* (2013.01)

(58) Field of Classification Search
CPC ........ F28D 1/0333; F28D 9/005; F28F 3/046; F28F 3/042; F28F 3/12

USPC .......................................................... 165/166
See application file for complete search history.

(56) References Cited

U.S. PATENT DOCUMENTS

| | | | |
|---|---|---|---|
| 4,403,652 A | 9/1983 | Schiltz et al. | |
| 5,005,640 A * | 4/1991 | Lapinski | F28D 9/00 165/142 |
| 6,253,835 B1 * | 7/2001 | Chu | F28F 3/12 174/15.1 |
| 6,895,026 B2 * | 5/2005 | Miyajima | H01S 5/02423 257/E23.098 |
| 7,011,142 B2 | 3/2006 | Davies et al. | |
| 7,522,643 B2 * | 4/2009 | Miyajima | H01S 5/02423 372/36 |
| 10,006,722 B2 | 6/2018 | Kenney et al. | |
| 10,263,301 B2 | 4/2019 | Kenney et al. | |
| 2001/0004312 A1 * | 6/2001 | Miyajima | H01S 5/4031 361/689 |
| 2001/0004370 A1 * | 6/2001 | Miyajima | H01L 23/473 257/E23.098 |

(Continued)

FOREIGN PATENT DOCUMENTS

| | | | |
|---|---|---|---|
| DE | 102012006122 A1 | 9/2013 | |
| FR | 3011131 A1 * | 3/2015 | ............... F28F 3/12 |

(Continued)

*Primary Examiner* — Tho V Duong
(74) *Attorney, Agent, or Firm* — McCoy Russell LLP

(57) ABSTRACT

Methods and systems are provided for heat exchangers including a first outer plate, a second outer plate, and an intermediate plate. The intermediate plate is positioned between the outer plates. Fluid flow passages are formed between the intermediate plate and each of the outer plates.

20 Claims, 10 Drawing Sheets

(56) References Cited

U.S. PATENT DOCUMENTS

| | | | |
|---|---|---|---|
| 2002/0195238 A1* | 12/2002 | Takigawa | H01S 5/024 |
| | | | 165/166 |
| 2012/0237805 A1* | 9/2012 | Abels | F28F 3/12 |
| | | | 228/136 |
| 2015/0236385 A1* | 8/2015 | Park | H01M 10/6554 |
| | | | 429/120 |
| 2016/0036104 A1* | 2/2016 | Kenney | H01M 10/6557 |
| | | | 165/170 |
| 2016/0315365 A1* | 10/2016 | Vanderwees | H01M 10/6557 |
| 2018/0261526 A1 | 9/2018 | Machler et al. | |
| 2018/0337434 A1 | 11/2018 | Burgers et al. | |
| 2019/0109357 A1 | 4/2019 | Kenney | |
| 2019/0277578 A1 | 9/2019 | Bardeleben et al. | |

FOREIGN PATENT DOCUMENTS

| | | |
|---|---|---|
| WO | 2019169502 A1 | 9/2019 |
| WO | 2019180385 A1 | 9/2019 |
| WO | 2019227221 A1 | 12/2019 |
| WO | 2020019058 A1 | 1/2020 |

\* cited by examiner

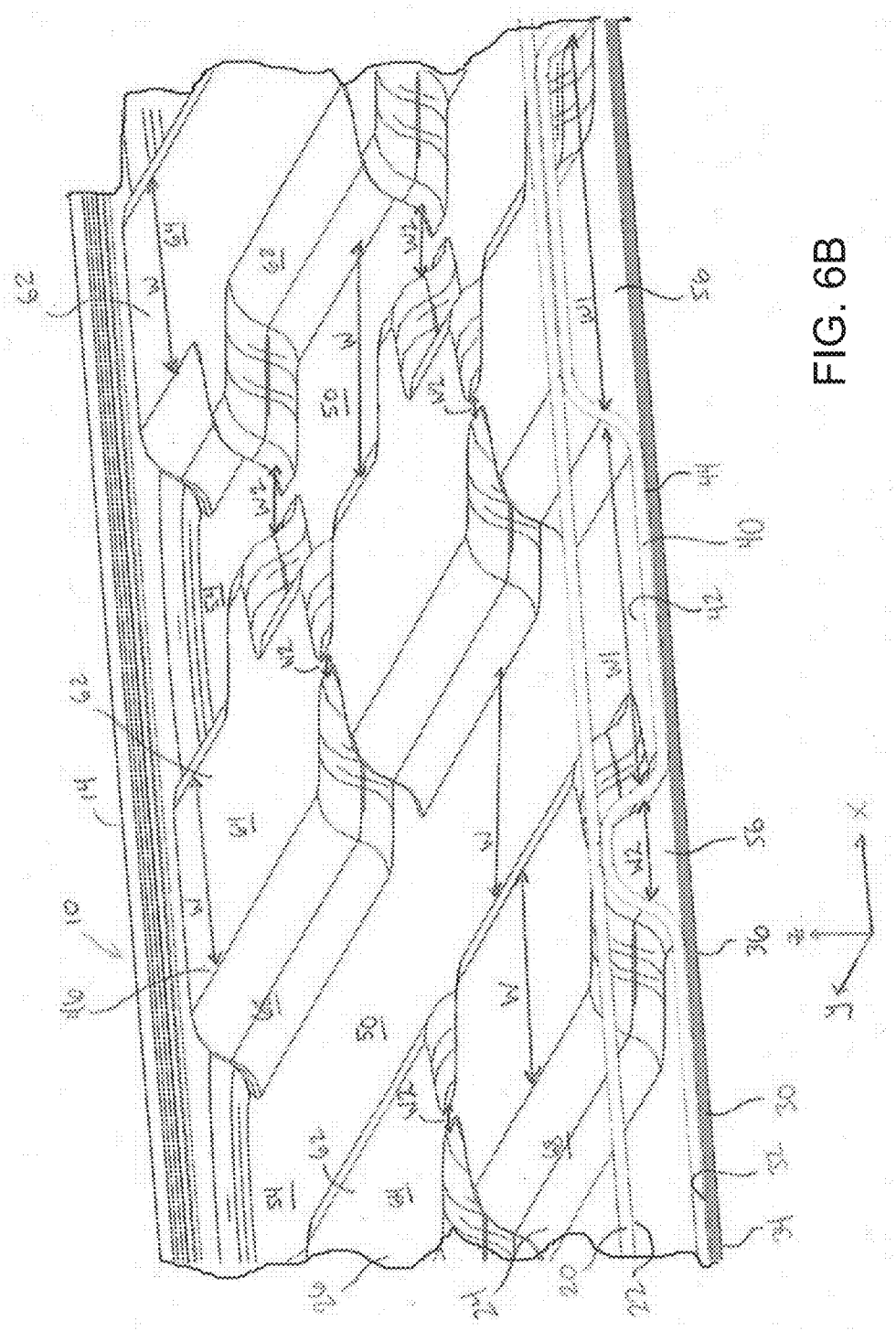

THREE-LAYER HEAT EXCHANGER WITH INTERNAL MANIFOLD FOR BATTERY THERMAL MANAGEMENT

CROSS-REFERENCE TO RELATED APPLICATIONS

The present application claims priority to U.S. Provisional Application No. 62/877,652, entitled "THREE-LAYER HEAT EXCHANGER WITH INTERNAL MANIFOLD FOR BATTERY THERMAL MANAGEMENT", and filed on Jul. 23, 2019. The entire contents of the above-listed application are hereby incorporated by reference for all purposes.

TECHNICAL FIELD

The present disclosure relates generally to systems and methods for thermal management of rechargeable batteries within an energy storage system of a battery electric vehicle (BEV) or hybrid electric vehicle (HEV), and particularly to heat exchangers adapted for cooling rechargeable batteries.

BACKGROUND

Energy storage systems such as those used in BEVs and HEVs comprise rechargeable lithium-ion batteries. A typical rechargeable battery for a BEV or HEV comprises a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that needs to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. Pat. No. 10,263,301 entitled COUNTER-FLOW HEAT EXCHANGER FOR BATTERY THERMAL MANAGEMENT APPLICATIONS, which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid is higher at the outlet than at the inlet.

There is a need for battery heat exchangers which achieve improved temperature uniformity across the surfaces which are in contact with the battery cells.

SUMMARY

In accordance with an aspect of the present disclosure, there is provided a heat exchanger having a first end and a second end spaced apart along a longitudinal direction, and comprising a first outer plate, a second outer plate, and an intermediate plate.

According to an aspect, the first outer plate has an inner surface, an opposed outer surface, a central area and a peripheral flange surrounding the central area.

According to an aspect, the second outer plate has an inner surface, an opposed outer surface, a central area and a peripheral flange surrounding the central area.

According to an aspect, the intermediate plate is disposed between the first outer plate and the second outer plate. The intermediate plate has a first surface facing the inner surface of the first outer plate, an opposed second surface facing the inner surface of the second outer plate, and a peripheral flange sandwiched between and in sealed engagement with the peripheral flanges of the first and second outer plates.

According to an aspect, the heat exchanger further comprises a plurality of first fluid flow passages defined between the first surface of the intermediate plate and the inner surface of the first outer plate. Each of the first fluid flow passages has a first end for inletting a fluid into the first fluid flow passages and a second end for discharging the fluid from the first fluid flow passages. The plurality of first fluid flow passages extends along the longitudinal direction.

According to an aspect, the heat exchanger further comprises a plurality of second fluid flow passages defined between the second surface of the intermediate plate and the inner surface of the second outer plate. Each of the second fluid flow passages has a first end for inletting the fluid into the second fluid flow passages and a second end for discharging the fluid from the second fluid flow passages. The plurality of second fluid flow passages extends along the longitudinal direction.

According to an aspect, the heat exchanger further comprises a first fluid manifold extending transversely across the heat exchanger. The first fluid manifold is located between the first surface of the intermediate plate and the inner surface of the first outer plate and proximate to the first end of the heat exchanger. The first fluid manifold is in flow communication with the first ends of the plurality of first fluid flow passages.

According to an aspect, the heat exchanger further comprises a second fluid manifold extending transversely across the heat exchanger. The second fluid manifold is located between the first surface of the intermediate plate and the inner surface of the second outer plate and proximate to the first end of the heat exchanger. The first fluid manifold is in flow communication with the second ends of the plurality of first fluid flow passages.

According to an aspect, the heat exchanger further comprises a first fluid port located proximate to the first end of the heat exchanger and in flow communication with the first fluid manifold, and a second fluid port located proximate to the first end of the heat exchanger and in flow communication with the second fluid manifold.

According to an aspect, the heat exchanger further comprises a third fluid manifold extending transversely across the heat exchanger. The third fluid manifold is located between the first surface of the intermediate plate and the inner surface of the first outer plate and proximate to the second end of the heat exchanger, the third fluid manifold being in flow communication with the second ends of the plurality of first fluid flow passages.

According to an aspect, the heat exchanger further comprises a fourth fluid manifold extending transversely across the heat exchanger. The fourth fluid manifold is located between the first surface of the intermediate plate and the inner surface of the second outer plate and proximate to the second end of the heat exchanger. The fourth fluid manifold is in flow communication with the first ends of the plurality of second fluid flow passages.

According to an aspect, the heat exchanger further comprises at least one fluid flow opening extending through the intermediate plate and providing flow communication between the third and fourth manifolds.

According to an aspect, the plurality of first fluid flow passages and the plurality of second fluid flow passages are disposed in alternating relationship such that each one of the plurality of first fluid flow passages is disposed adjacent to at least one of the plurality of second fluid flow passages.

According to an aspect, the heat exchanger has a longitudinal axis parallel to the pluralities of first and second fluid flow passages, with a first portion and a second portions of the heat exchanger being defined on opposite sides of the longitudinal axis. The first and second fluid ports may both be located in the first portion of the heat exchanger.

According to an aspect, each of the first and second fluid flow passages in the first portion of the heat exchanger includes a minimum width and a maximum width, and each of the first and second fluid flow passages in the second portion of the heat exchanger includes a minimum width and a maximum width.

According to an aspect, the minimum width of at least one of the first and second fluid flow passages in the first portion of the heat exchanger is less than the minimum width of each of the first and second fluid flow passages in the second portion of the heat exchanger.

According to an aspect, the minimum width of each of the first fluid flow passages in the first portion of the heat exchanger is defined by one or more flow restrictions.

According to an aspect, the intermediate plate comprises a plurality of longitudinally-extending corrugations defined by a plurality of ridges and a plurality of side walls between the ridges. The plurality of ridges includes a plurality of first ridges and a plurality of second ridges. The plurality of first ridges is defined on the first surface of the intermediate plate and sealingly joined to the inner surface of the first outer plate. The plurality of second ridges is defined on the second surface of the intermediate plate and sealingly joined to the inner surface of the second outer plate. Each of the first ridges and each of the second ridges has opposed first and second ends which are spaced from the flange of the intermediate plate. Each of the flow restrictions in the first fluid flow passages of the first portion of the heat exchanger is defined by a narrowing in a width of one of the second ridges.

According to an aspect, the minimum width of at least one of the second fluid flow passages in the first portion of the heat exchanger is substantially the same as the minimum width of each of the first fluid flow passages in the first portion of the heat exchanger. The minimum width of the at least one second fluid flow passage in the first portion of the heat exchanger is defined by one or more flow restrictions.

According to an aspect, the at least one second fluid flow passage having a minimum width substantially the same as the minimum width of each of the first fluid flow passages located proximate to the second portion of the heat exchanger.

According to an aspect, each of the first ridges and each of the second ridges has opposed first and second ends which are spaced from the flange of the intermediate plate. Each of the flow restrictions in the at least one second fluid flow passage in the first portion of the heat exchanger is defined by a narrowing in a width of one of the first ridges.

According to an aspect, each of the flow restrictions comprises a localized area of one of the first and second fluid flow passages of the first portion of the heat exchanger.

According to an aspect, each of the first and second fluid flow passages of the first portion of the heat exchanger includes a plurality of the flow restrictions spaced apart along the longitudinal direction.

According to an aspect, one or more of the first fluid flow passages of the first portion of the heat exchanger includes one of the flow restrictions at the first end thereof.

According to an aspect, each of the first and second fluid flow passages in the second portion of the heat exchanger has a constant width, such that the maximum width and the minimum width of the flow passages in the second portion of the heat exchanger are the same.

According to an aspect, a width of the first portion of the heat exchanger is less than a width of the second portion.

According to an aspect, the at least one fluid flow opening is located in the second portion of the heat exchanger.

According to an aspect, the intermediate plate is free of any openings between the third and fourth manifolds in the first portion of the heat exchanger.

According to an aspect, the first ends of the first and second ridges are located proximate to the first end of the heat exchanger and the second ends of the first and second ridges are located proximate to the second end of the heat exchanger. The at least one fluid flow opening is located between the peripheral flange of the intermediate plate and the second ends of the first and second ridges.

According to an aspect, the at least one fluid flow opening comprises a plurality of fluid flow openings The plurality of fluid flow openings includes a proximal fluid flow opening which is closest to the first portion of the heat exchanger and a distal fluid flow opening which is farthest from the first portion of the heat exchanger. The proximal fluid flow opening has an area which is less than an area of the distal fluid flow opening.

According to an aspect, the distal fluid flow opening comprises an elongate, transversely-extending slot.

According to an aspect, the heat exchanger further comprises a flow-directing rib located in the first manifold between the first fluid port and the first ends of the first fluid flow passages. The flow-directing rib is adapted to direct fluid flow in a transverse direction.

According to an aspect, the heat exchanger further comprises a flow-directing rib located in the second manifold between the second fluid port and the second ends of the second fluid flow passages. The flow-directing rib is adapted to direct fluid flow in a transverse direction.

According to an aspect, the first and second fluid ports are located proximate to opposite longitudinally-extending sides of the heat exchanger.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Exemplary embodiments of the present disclosure will now be described, by way of example, with reference to the accompanying drawings, in which:

FIG. 6B is an enlarged, partial transverse cross-section along line 6-6' of FIG. 2;

FIGS. 1-9 are shown approximately to scale.

DETAILED DESCRIPTION

Figure 1:
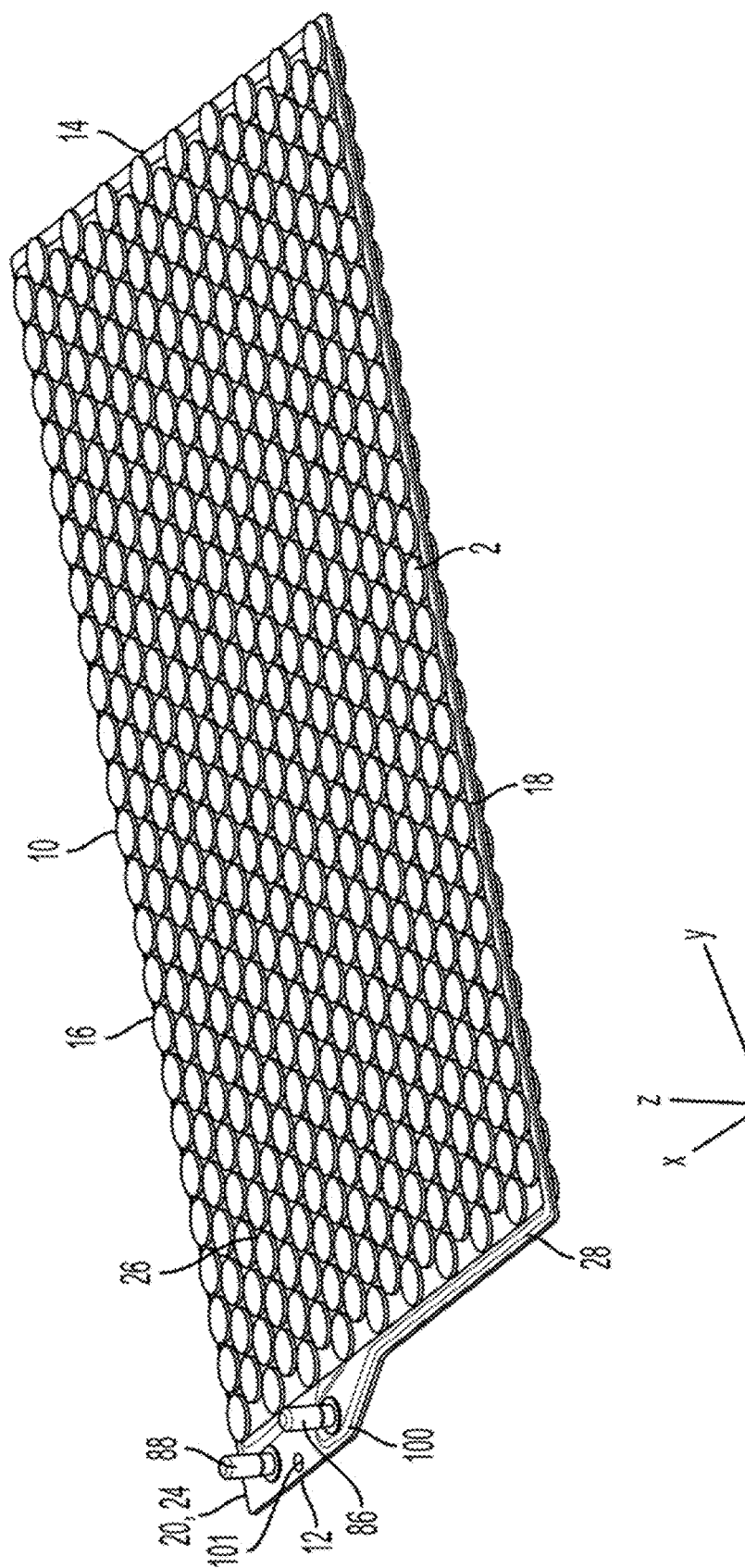
FIG. 1 is a perspective view of a heat exchanger with a plurality of battery cells supported on its outer surface.
Figure 2:
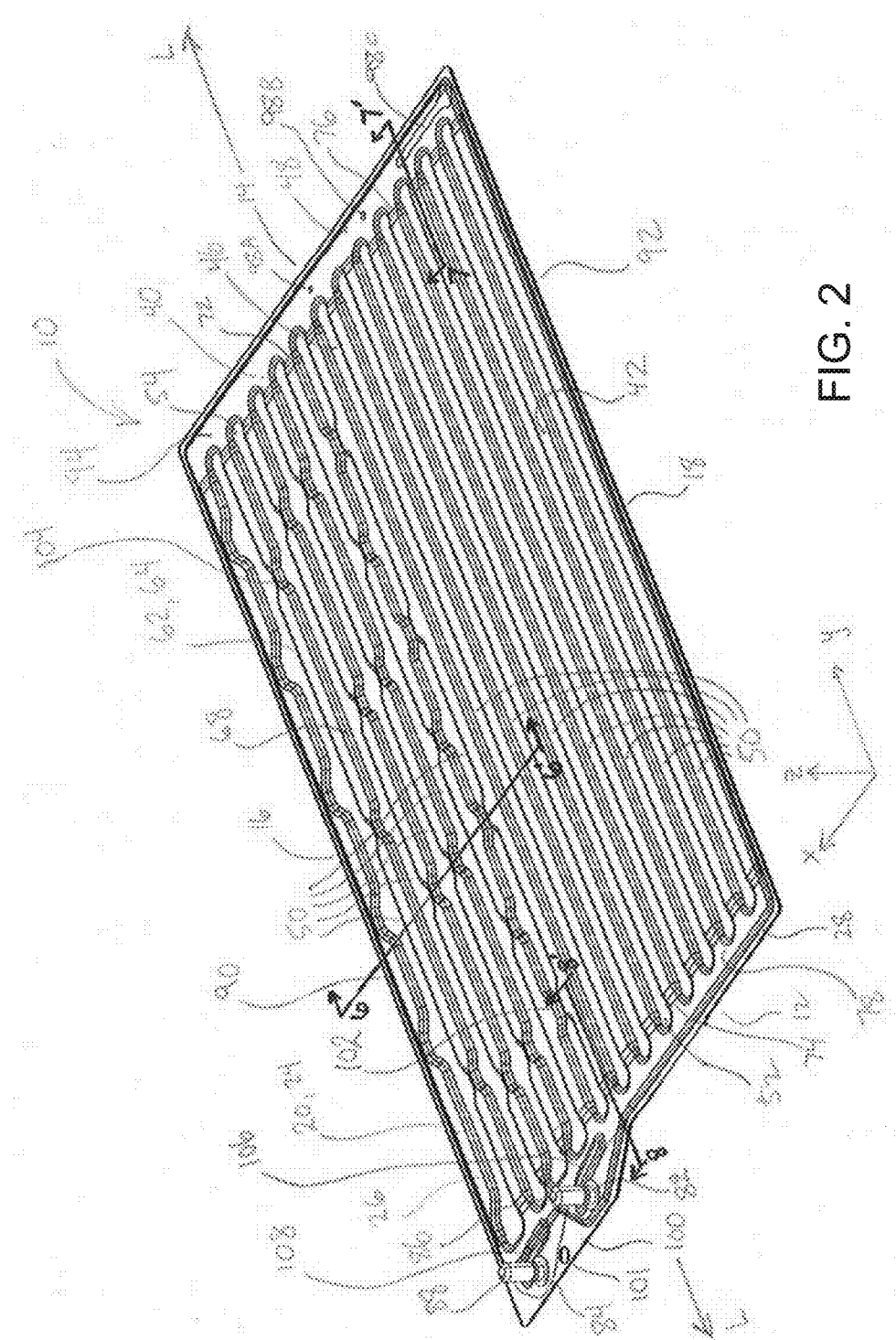
FIG. 2 is a top perspective view of the heat exchanger of FIG. 1, with the first outer plate shown as being transparent.
Figure 3:
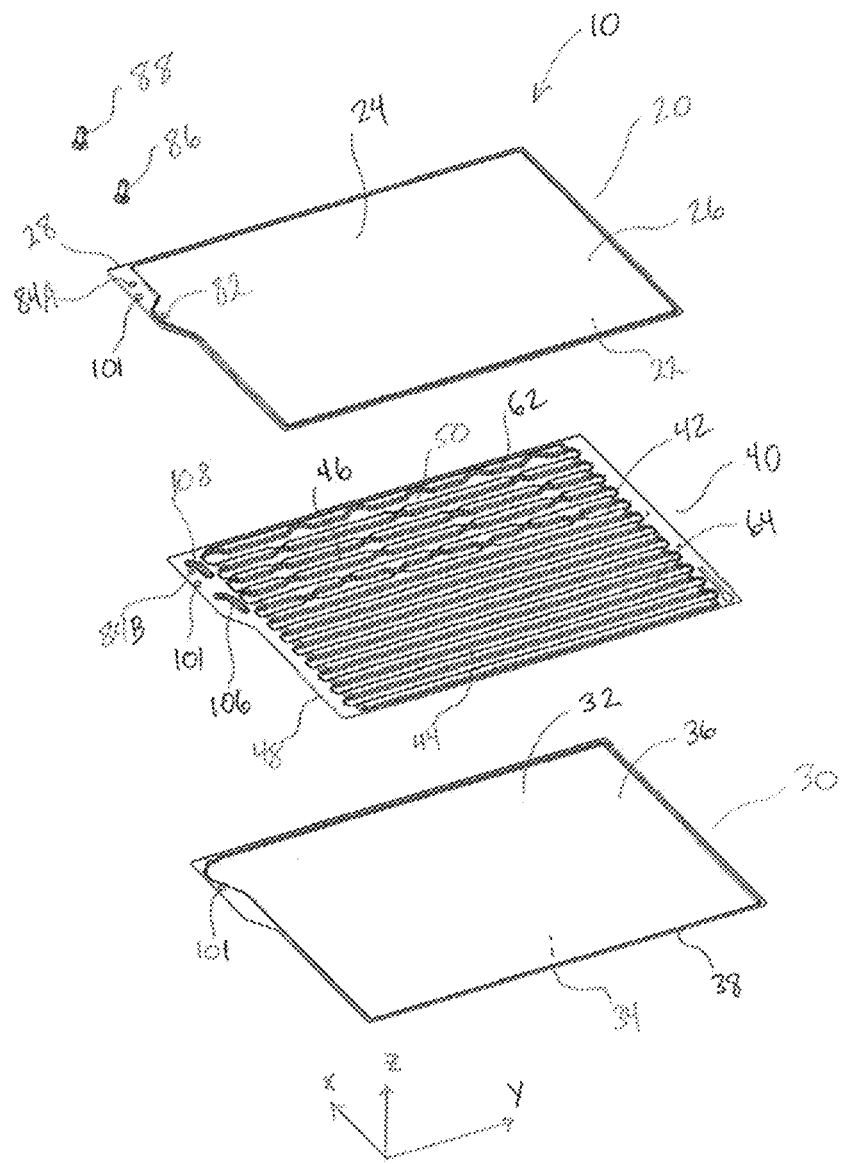
FIG. 3 is an exploded perspective view of the heat exchanger of FIG. 1.

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

A heat exchanger 10 according to a first embodiment is shown in FIGS. 1 to 8. Heat exchanger 10 has a first end 12 and a second end 14 spaced apart along a longitudinal direction (y-axis), and a first side 16 and a second side 18 spaced apart along a transverse axis (x-axis). In the present embodiment, the heat exchanger 10 is generally rectangular and is elongated in the longitudinal direction, such that the sides 16, 18 are longer than the ends 12, 14. However, this is not essential.

Heat exchanger 10 comprises a first outer plate 20 having an inner surface 22, an opposed outer surface 24, a central area 26 and a peripheral flange 28 surrounding the central area 26. The central area 26 is substantially flat and provides a flat surface which is in thermal contact with one or more battery cells 2, with the one or more battery cells 2 optionally being supported thereon. FIG. 1 shows the footprints of a plurality of battery cells 2, the cells 2 being cylindrical and arranged with one of their circular end surfaces in thermal contact with, and optionally supported on, the outer surface 24 of the first outer plate 20, in the central area 26 thereof.

The number, shape and arrangement of the battery cells 2 supported on the heat exchanger may differ from that shown. For example, cylindrical battery cells 2 may be replaced by prismatic cells which are in the shape of a rectangular prism, as shown in commonly assigned International Patent Application No. PCT/CA2019/050745, filed on May 30, 2019. Although not shown, the battery cells 2 are electrically connected together. In addition, a thin layer of thermal interface material (TIM) (not shown) may be provided between the outer surface 24 of first outer plate 20 and the circular end surfaces of the battery cells 2 to enhance thermal contact between the heat exchanger 10 and battery cells 2. The TIM may comprise a thermally conductive grease, wax or metallic material.

Heat exchanger 10 further comprises a second outer plate 30 having an inner surface 32, an opposed outer surface 34, a central area 36 and a peripheral flange 38 surrounding the central area. The central area 36 is substantially flat and provides a flat surface which may be in thermal contact with one or more battery cells 2. Although not shown in the drawings, one or more battery cells, which may have the cylindrical shape of battery cells 2, may be in thermal contact with the outer surface 36 of the second outer plate 30, in the central area 36 thereof.

The first and second outer plates 20 and 30 each comprise a shaped plate which may be formed from a flat sheet by stamping the central area 26, 36, such that the central area 26, 36 is spaced from the peripheral flange 28, 38 in the height dimension of the plates 20, 30 (z-axis). The outer plates 20, 30 are arranged with their inner surfaces 22, 32 facing toward each other.

Heat exchanger 10 further comprises an intermediate plate 40 disposed between the first outer plate 20 and the second outer plate 30, the intermediate plate 40 having a first surface 42 facing the inner surface 22 of the first outer plate 20 and an opposed second surface 44 facing the inner surface 32 of the second outer plate 30. The intermediate plate 40 also has a central area 46 and a peripheral flange 48 surrounding the central area 46.

The peripheral flange 48 of the intermediate plate 40 is sandwiched between and in sealed engagement with the peripheral flanges 28, 38 of the respective first and second outer plates 20, 30. The peripheral flanges 28, 38, 48 are flat and planar such that the sealed flanges 28, 38, 48 provide a continuous fluid-tight seal along the ends 12, 14 and sides 16, 18 of heat exchanger 10.

A plurality of first fluid flow passages 50 are defined between the first surface 42 of intermediate plate 40 and the inner surface 22 of the first outer plate 20. Each of the first fluid flow passages 50 has a first end 52 for inletting a fluid into the first fluid flow passage 50 and a second end 54 for discharging the fluid from the first fluid flow passage 50. The first fluid flow passages 50 extend along the longitudinal direction (y-axis).

A plurality of second fluid flow passages 56 are defined between the second surface 44 of intermediate plate 40 and the inner surface 32 of the second outer plate 30. Each of the second fluid flow passages 56 has a first end 58 for inletting a fluid into the second fluid flow passage 56 and a second end 60 for discharging the fluid from the second fluid flow passage 56. The second fluid flow passages 56 also extend along the longitudinal direction (y-axis).

In the present embodiment, the intermediate plate 40 comprises a plurality of longitudinally-extending corrugations 62 defined by a plurality of first ridges 64, a plurality of second ridges 66, and a plurality of side walls 68 between the first and second ridges 64, 66. The plurality of first ridges 64 are defined on the first surface 42 of the intermediate plate 40 and are sealingly joined to the inner surface 22 of the first outer plate 20. The plurality of second ridges 66 are defined on the second surface 44 of the intermediate plate 40 and are sealingly joined to the inner surface 32 of the second outer plate 30. Each of the side walls 68 extends between one of the first ridges 64 and one of the second ridges 66.

The first and second ridges 64, 66 may define rounded or flat surfaces, and in the present embodiment they are flat. The first ridges 64 are spaced from the peripheral flange 48 of intermediate plate 40 in a first direction along the height dimension (along z-axis) of intermediate plate 40. The second ridges 66 are spaced from peripheral flange 48 in an opposite second direction along the height dimension of intermediate plate 40.

It can also be seen that the corrugations 62 and first and second ridges 64, 66 have opposed first and second ends 74, 76 which are spaced from the peripheral flange 48 of intermediate plate 40. The first ends 74 of the corrugations 62 and ridges 64, 66 are proximate to the first end 12 of heat exchanger 10, proximate to the first ends 52 of first fluid flow passages 50, and proximate to the second ends 60 of second fluid flow passages 56. The second ends 76 of corrugations 62 and ridges 64, 66 are proximate to the second end 14 of heat exchanger 10, proximate to the second ends 54 of first fluid flow passages 50, and proximate to the first ends 58 of second fluid flow passages 56.

In some embodiments, the corrugations 62 and ridges 64, 66 may terminate abruptly at the opposite ends 74, 76. However, in the present embodiment, the ends 74, 76 of corrugations 62 and ridges 64, 66 are gradually sloped from the ends of the flat surfaces of ridges 64, 66 to the plane in which the peripheral flange 48 is located. Thus, the ridges 64, 66 are gradually reduced in height at the ends 74, 76 thereof, producing a smooth transition between the ends 74, 76 to the peripheral flange 48, along both surfaces 42, 44 of intermediate plate 40.

The heat exchanger 10 further comprises a first fluid manifold 78 extending transversely (along x-axis) across the heat exchanger 10, the first fluid manifold 78 being located between the first surface 42 of the intermediate plate 40 and the inner surface 22 of the first outer plate 20, and being proximate to the first end 12 of heat exchanger 10. Along the longitudinal direction (along y-axis), the first fluid manifold 78 extends between the first ends 52 of the first fluid flow passages 50 and the sealed peripheral flanges 28, 48 of the first outer plate 20 and the intermediate plate 40, the first fluid manifold 78 being in flow communication with the first ends 52 of all the first fluid flow passages 50.

The first fluid manifold 78 extends across heat exchanger 10 connecting each of the first fluid flow passages 50. Fluid flows into the first fluid manifold 78 from an inlet and is then distributed across first fluid flow passages 50.

Heat exchanger 10 further comprises a second fluid manifold 80 extending transversely across the heat exchanger 10, the second fluid manifold 80 being located between the second surface 44 of the intermediate plate 40 and the inner surface 32 of the second outer plate 30, and being proximate to the first end 12 of heat exchanger 10. Along the longitudinal direction, the second fluid manifold 80 extends between the second ends 60 of the second fluid flow passages 56 and the sealed peripheral flanges 38, 48 of the second outer plate 30 and the intermediate plate 40, the second fluid manifold 80 being in flow communication with the second ends 60 of all the second fluid flow passages 56.

The second fluid manifold 80 extends across heat exchanger 10 connecting each of the second fluid flow passages 56. Fluid flows into the second fluid manifold 80 from second fluid flow passages 56 and exits through an outlet.

Each of the first and second fluid manifolds 78, 80 may be the inlet or outlet manifold of heat exchanger 10. In the present embodiment, the second fluid manifold 80 is the inlet manifold and the first fluid manifold 78 is the outlet manifold, however, it will be appreciated that the direction of fluid flow may be reversed such that the first fluid manifold 78 is the inlet manifold and the second fluid manifold 80 is the outlet manifold.

It will be appreciated from the above discussion that the inlet and outlet manifolds defined by manifolds 78, 80 are located entirely inside the plate structure defined by the three plates 20, 30, 40. Furthermore, it will be appreciated that the flat portions of the first and second outer plates 20, 30 extend over the first and second fluid manifolds 78, 80, thereby providing additional surface area for heat transfer. In this regard, it can be seen from FIG. 1 that some of the battery cells 2 are positioned directly over the first fluid manifold 78. It can also be seen that the first and second fluid manifolds 78, 80, both being located proximate to the first end 12 of heat exchanger 10, are separated only by the thickness of the intermediate plate 40. During use, one of manifolds 78, 80 will contain relatively cold fluid received from the inlet, while the other manifold 78, 80 will contain relatively hot fluid which has absorbed heat from the battery cells 2. It is expected that there may be some conductive heat transfer between the hot and cold fluids in manifolds 78, 80, thereby modulating the fluid temperatures proximate to the inlet and outlet.

Fluid is supplied to and discharged from heat exchanger 10 through a first fluid port 82 and a second fluid port 84. The first fluid port 82 is located proximate to the first end 12 of heat exchanger 10 and is in flow communication with the first fluid manifold 78. In the present embodiment, the first fluid port 82 comprises an opening in the central area 26 of first outer plate 20 and is provided with a first fitting 86 comprising a hollow tube which is adapted for connection to a fluid conduit of a vehicle fluid circulation system (not shown). The base of first fitting 86 is mounted to the outer surface 24 of the first outer plate 20.

The second fluid port 84 is located proximate to the first end 12 of heat exchanger 10 and is in flow communication with the second fluid manifold 80. In the present embodiment, the second fluid port 84 comprises a pair of aligned openings in the first outer plate 20 and the intermediate plate 40. The individual openings in the plates 20, 40 are identified with reference characters 84A and 84B in the following discussion and in drawings, where they are referred to or shown individually. The second fluid port 84 is provided with a second fitting 88 comprising a hollow tube which is adapted for connection to a fluid conduit of a vehicle fluid circulation system (not shown). The base of second fitting 88 is mounted to the outer surface 24 of the first outer plate 20. More specifically, the second fitting 88 is mounted to a portion of first outer plate 20 which is outside the central area 26 thereof, and which forms part of the peripheral flange 28. The area of first outer plate 20 surrounding second fitting 88 is therefore sealed directly to the first surface 42 of intermediate plate 40, and therefore the second fitting 88 does not communicate with the central area 26 of first outer plate 20.

It can be seen that the two fluid ports 82, 84 are located in an extension area 100 of heat exchanger 10, and outside the areas of the first and second outer plates 20, 30 which are adapted for thermal contact with battery cells 2. The extension area 100 is located in the first portion of heat exchanger 10, and at the first end 12 thereof. The extension area 100 includes all three layers of plates 20, 30, 40. The intermediate plate 40 is flat throughout extension area, and co-planar with the peripheral flange 48 thereof. The central areas 36, 46 of both outer plates 20, 30 extend into the extension area 100, such that the extension area 100 includes portions of both the first and second fluid manifolds 78, 80 which are in direct flow communication with the respective first and second fluid ports 82, 84. It will be appreciated that in the described embodiment the peripheral flange 28 of first outer plate 20 may not be extended to the area of second fitting 88, in which case the base of second fitting 88 may be mounted directly to the first surface 42 of intermediate plate 44, and such that the second fluid port 84 consists only of the opening 84B in the intermediate plate 40. The extension area 100 may also include one or more mounting holes 101.

In the present embodiment the two fluid ports 82, 84 are arranged side-by-side and spaced apart from one another transversely (along the x-axis). In heat exchanger 10, both fluid ports 82, 84 are proximate to the first end 12 of heat exchanger 10, and both fluid ports 82, 84 are closer to the first side 16 than to the second side 18. As will be further discussed below, the heat exchanger 10 can be divided into a first portion 90 and second portion 92 located on opposite sides of a longitudinal axis L which is parallel to the longitudinal direction (y-axis) and to the first and second fluid flow passages 50, 56. The first and second fluid ports 82, 84 are both located in the first portion 90 and, in the present embodiment, the second portion 92 may be wider (along x-axis) than the first portion 90.

The two fluid ports 82, 84 of heat exchanger 10 are configured such that the first and second fittings 86, 88 both extend along the z-axis from the outer surface 24 of the first outer plate 20. However, it will be appreciated that the heat exchanger 10 may instead have both fittings 86, 88 projecting from the outer surface 34 of the second outer plate 30. Alternatively, the first fluid port and fitting 82, 86 may be as shown in the drawings, and the second fluid port 84 may be formed in the central area 36 of the second outer plate 30, with the base of the second fitting 88 being mounted to the outer surface 34 of second outer plate 30, directly over the second fluid manifold 80. In such a configuration, the fittings 86, 88 will extend in opposite directions along the z-axis. It is also possible to provide the first and second fluid ports 82, 84 in the edge of the heat exchanger 10, along the first end 12 thereof, with "side-entry" fittings projecting from the end 12 of heat exchanger 10, along the y-axis, in the manner shown in commonly assigned US Publication No. 2018/0261526 A1, published on Sep. 13, 2018, and in U.S. patent application Ser. No. 16/295,642 filed on Mar. 7, 2019, the contents of these documents being incorporated herein by reference.

Proximate to its second end 14, heat exchanger 10 comprises a third fluid manifold 94 extending transversely across the heat exchanger 10, the third fluid manifold 94 being located between the first surface 42 of the intermediate plate 40 and the inner surface 22 of the first outer plate 20. Along the longitudinal direction (along y-axis), the third fluid manifold 94 extends between the second ends 54 of the first fluid flow passages 50 and the sealed peripheral flanges 28, 48 of the first outer plate 20 and the intermediate plate 40, the third fluid manifold 94 being in flow communication with the second ends 54 of all the first fluid flow passages 50.

The third fluid manifold 94 extends across heat exchanger 10 connecting each of the first fluid flow passages 50. Fluid flows into the third fluid manifold 94 from first fluid flow passages 50 and exits the third fluid manifold 94 through flow openings 98 into the fourth fluid manifold 96.

Heat exchanger 10 further comprises a fourth fluid manifold 96 extending transversely across the heat exchanger 10, the fourth fluid manifold 96 being located between the second surface 44 of the intermediate plate 40 and the inner surface 32 of the second outer plate 30, and being proximate to the second end 14 of heat exchanger 10. Along the longitudinal direction, the second fluid manifold 80 extends between the first ends 58 of the second fluid flow passages 56 and the sealed peripheral flanges 38, 48 of the second outer plate 30 and the intermediate plate 40, the second fluid manifold 80 being in flow communication with the first ends 58 of all the second fluid flow passages 56.

The fourth fluid manifold 96 extends across heat exchanger 10 connecting each of the second fluid flow passages 56. Fluid flows into the fourth fluid manifold 94 from the third fluid manifold 94 though openings 98 and exits the fourth fluid manifold 94 into the second fluid flow passages 56.

It can be seen that the third and fourth fluid manifolds 94, 96 are both located proximate to the second end 14 of heat exchanger 10 and are separated only by the intermediate plate 40. The third and fourth manifolds 94, 96 are both entirely enclosed within the plate structure defined by plates 20, 30, 40, and the flat portions of the first and second outer plates 20, 30 extend over the third and fourth fluid manifolds 94, 96. The third and fourth manifolds 94, 96 therefore provide additional surface area for heat transfer with battery cells 2, and FIG. 1 shows some of the battery cells 2 positioned directly over the third fluid manifold 94.

The heat exchanger 10 comprises at least one fluid flow opening 98 extending through the intermediate plate 40 and providing flow communication between the third and fourth manifolds 94, 96. In the present embodiment, the at least one fluid flow opening 98 is located in the second portion 92 of heat exchanger 10 and the first portion 90 is free of any openings between the third and fourth manifolds 94, 96.

Therefore, in the case where the second fluid port 84 is the inlet port and the first fluid port 82 is the outlet port, the heat transfer fluid enters second fluid port 84 and flows into the second fluid manifold 80, which is the inlet manifold, and is distributed transversely throughout the width of the heat exchanger 10 in the second fluid manifold 80. From there, the fluid enters the first ends 52 of the plurality of first fluid flow passages 50, and flows through the plurality of first fluid flow passages 50 to the second ends 54 thereof. The fluid exiting the second ends 54 of the first fluid flow passages 50 then enters the fourth fluid manifold 96 and is distributed transversely throughout the width of heat exchanger 10. The fluid in the fourth fluid manifold 96 then flows through the at least one fluid flow opening 98 in intermediate plate 40, into the third fluid manifold 94. The fluid entering third manifold 94 is distributed transversely throughout the width of heat exchanger 10, and then enters the first ends 58 of the second fluid flow passages 56, and flows through the plurality of second fluid flow passages 56 to the second ends 60 thereof. The fluid exiting the second ends 60 of the second fluid flow passages 56 then enters the first fluid manifold 78, and from there the fluid is discharged through the first fluid port 82. The direction of fluid flow in heat exchanger 10 can be reversed.

It can be seen from the drawings that the heat exchanger 10 has a "counterflow" flow pattern, wherein the plurality of first fluid flow passages 50 and the plurality of second fluid flow passages 56 are disposed in alternating relationship such that each one of the plurality of first fluid flow passages 50 is disposed adjacent to at least one of the plurality of second fluid flow passages 56.

In the counterflow pattern, the first and second fluid flow passages 50, 56 are separated by the side walls 68 of the corrugations 62, and these flow passages 50, 56 carry fluid at different temperatures. Therefore, there is some conductive heat transfer between the fluid flowing through the first and second fluid flow passages 50, 56. In addition, the counterflow arrangement reduces the number of cold and hot areas on the outer surfaces 24, 34 of the first and second outer plates 20, 30, thereby improving the temperature distribution across the outer surfaces of heat exchanger 10, and improving the temperature uniformity of the battery cells 2.

With the first and second fluid ports 82, 84 both being located proximate to the first end 12 of heat exchanger 10, and both being located in the first portion 90 of heat exchanger 10, the fluid flow will tend to be concentrated in the fluid flow passages 50, 56 of the first portion 90 of heat exchanger 10. Therefore, the heat exchanger 10 includes a number of additional features, some of which have already been described above, to improve fluid flow distribution throughout the area of heat exchanger 10 and to thereby improve temperature uniformity along the outer surfaces 24, 34 of first and second outer plates 20, 30, and in the battery cells 2.

For example, heat exchanger 10 includes a number of areas in which the widths (along x-axis) of the first and second fluid flow passages 50, 56 are increased and/or decreased, so as to meter the fluid flow entering and flowing through the first and second fluid flow passages 50, 56. In this regard, it can be seen that at least some of the first and second fluid flow passages 50, 56 in the first portion 90 of heat exchanger 10 have one or more areas in which the width is increased, and/or one or more areas in which the width is decreased.

Figure 4:
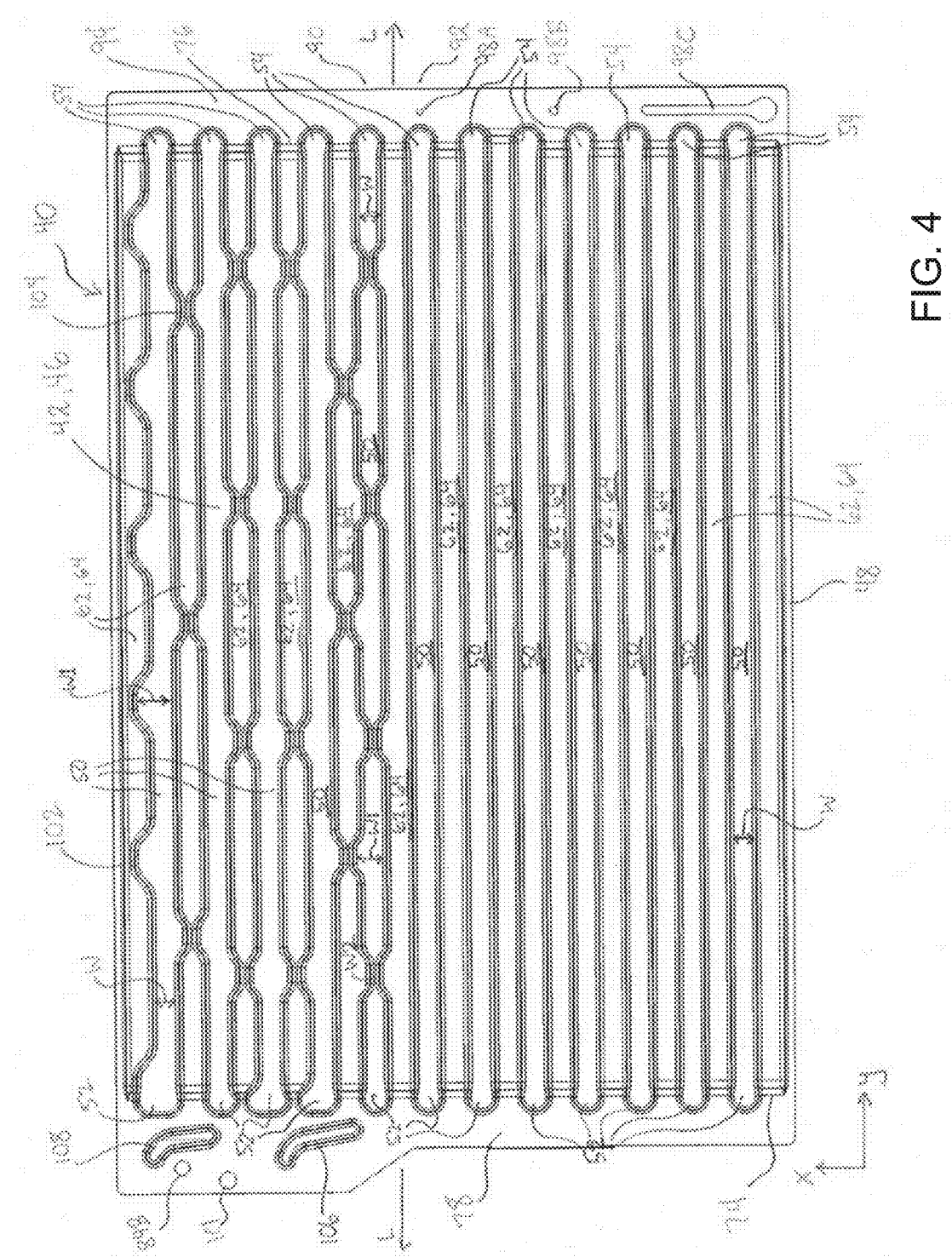
FIG. 4 is a top plan view of the intermediate plate of the heat exchanger of FIG. 1.
Figure 5:
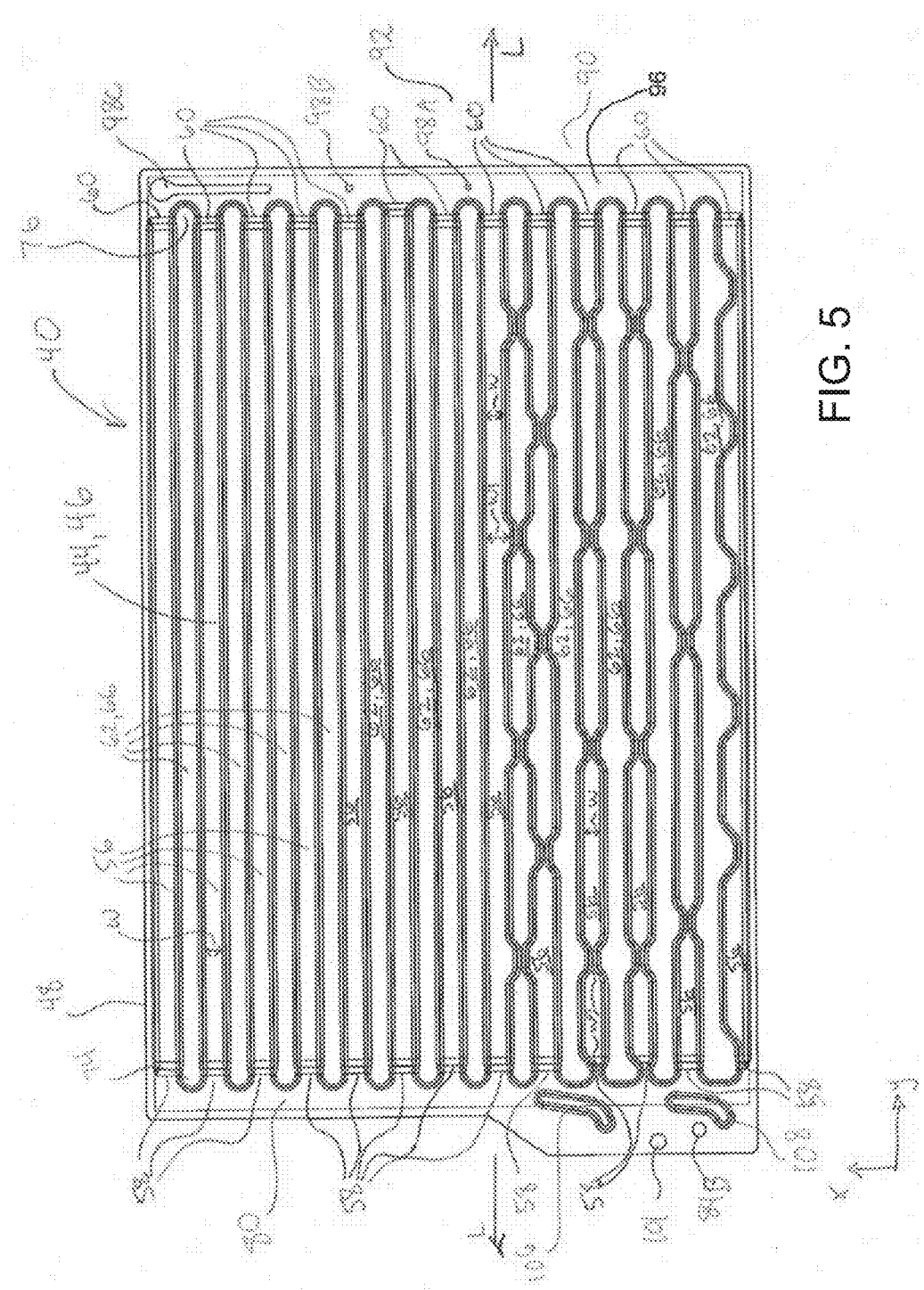
FIG. 5 is a bottom plan view of the intermediate plate of the heat exchanger of FIG. 1.
Figure 6A:
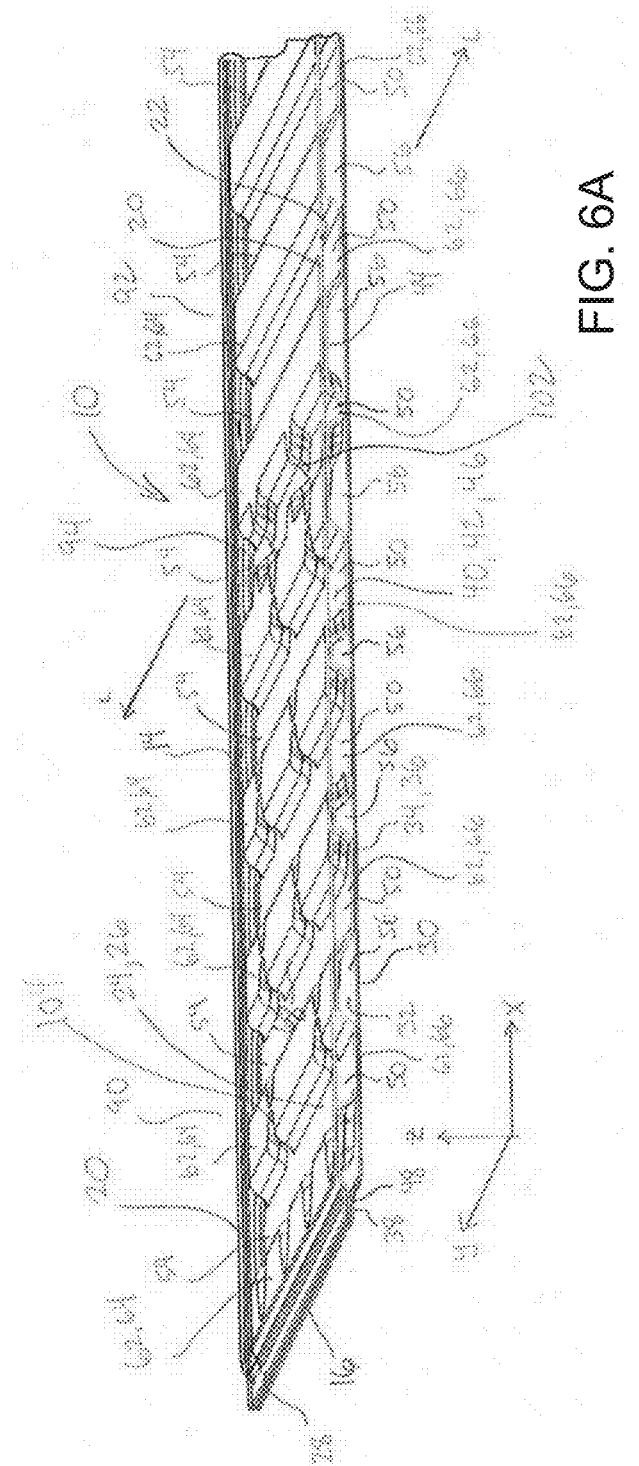
FIG. 6A is a transverse cross-section along line 6-6' of FIG. 2, with the first outer plate shown as being transparent.
Figure 7:
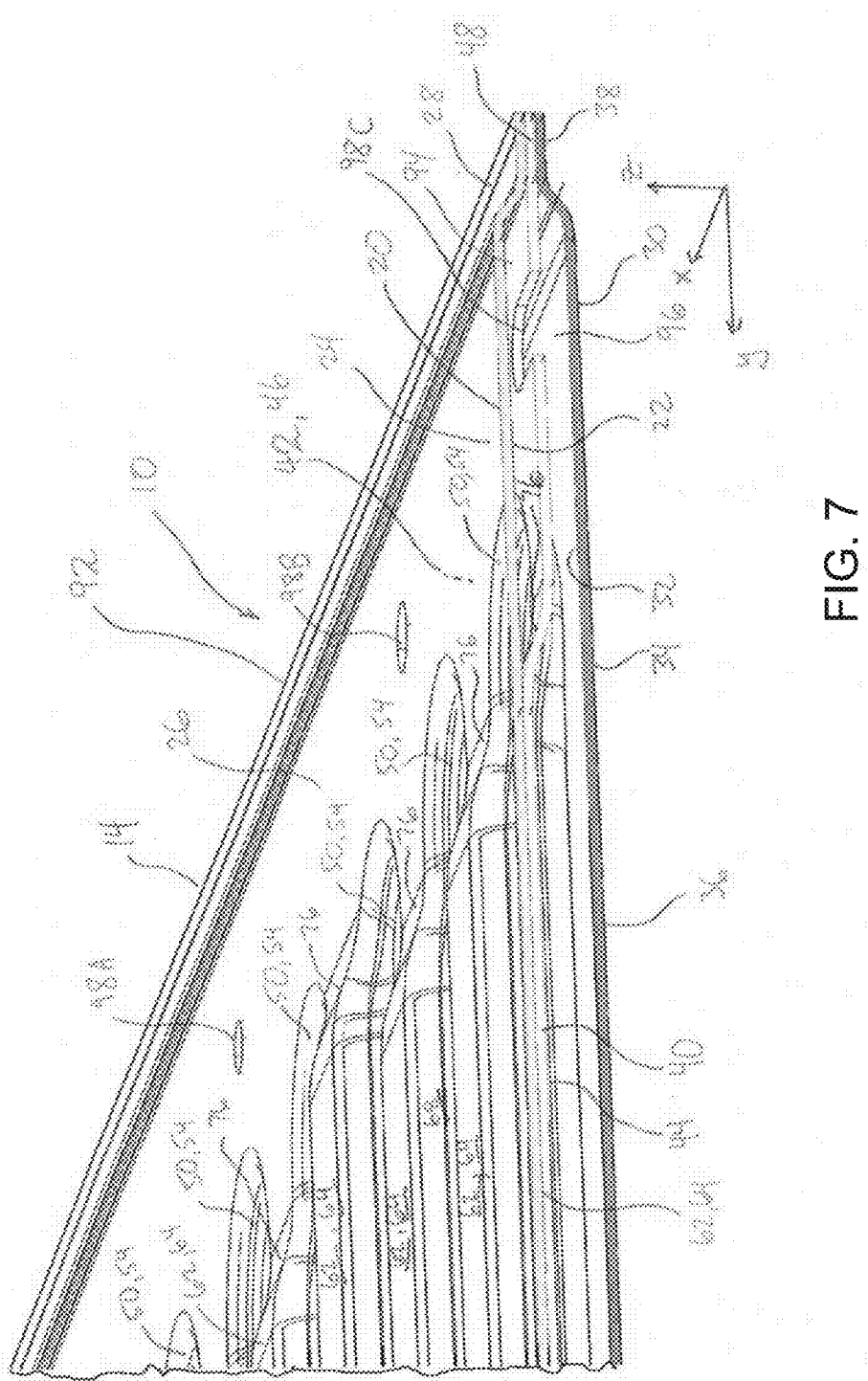
FIG. 7 is a longitudinal cross-section along line 7-7' of FIG. 2, with the first outer plate shown as being transparent.
Figure 8:
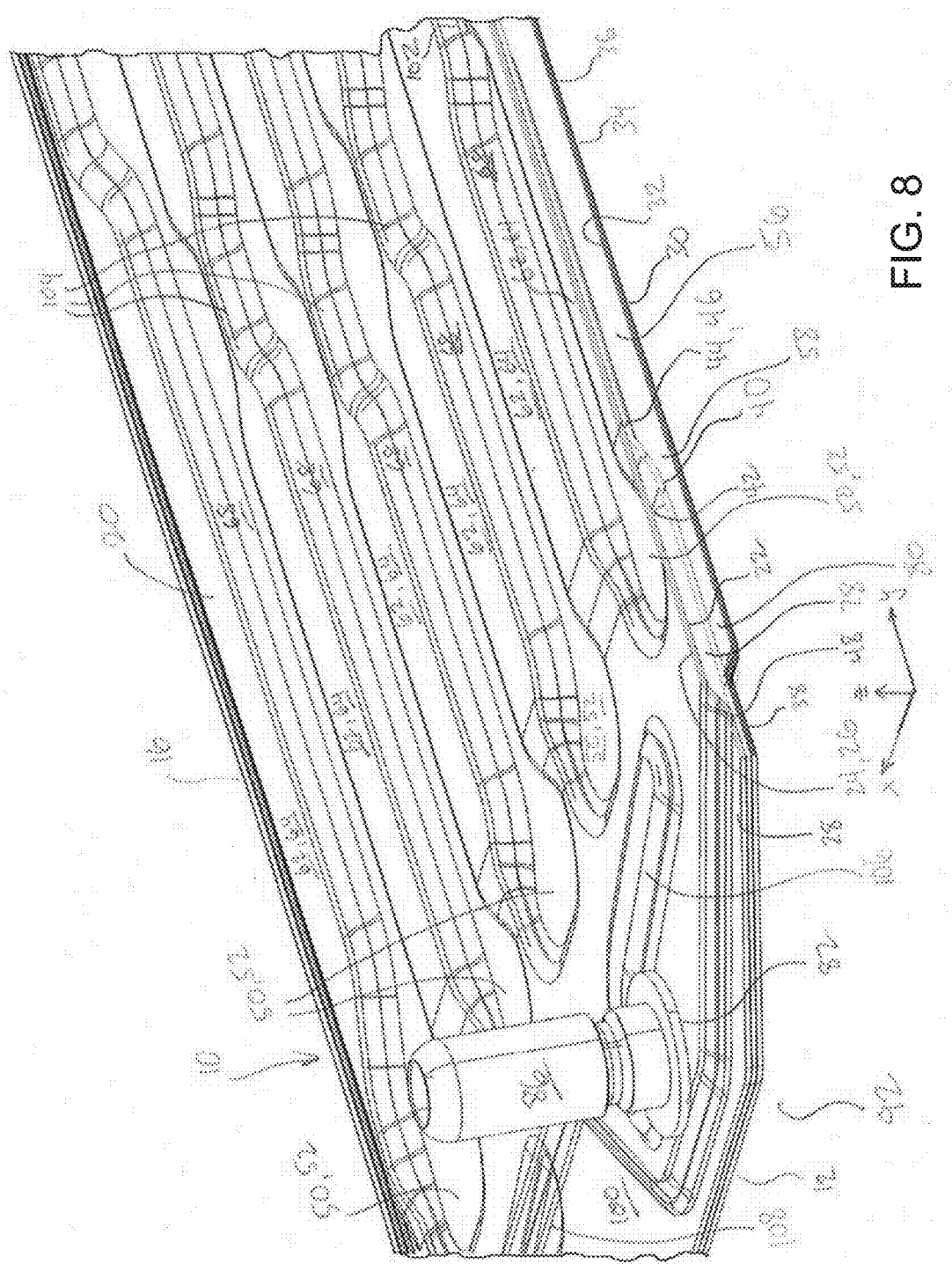
FIG. 8 is a longitudinal cross-section along line 8-8' of FIG. 2, with the first outer plate shown as being transparent.

For example, each of the first and second fluid flow passages 50, 56 have a base width W along a portion of their length, along with at least one area of increased width W1 and/or at least one area of decreased width W2, wherein W1>W>W2. Within each of the flow passages 50, 56, the width W1 or W defines the maximum width of that flow passage 50, 56, and the width W or W2 defines the minimum width of that flow passage. The width dimensions W, W1, W2 are shown in FIGS. 4, 5 and 6B.

In the illustrated embodiment, there are five first fluid flow passages 50 in first portion 90 of heat exchanger 10, along the first surface 42 of intermediate plate 40. In the first four of these flow passages 50 (i.e. closest to side 16), the minimum width is defined by base width W, and the maximum width is defined by a plurality of outwardly bulging areas having increased width W1. In the fifth of these flow passages 50 (i.e. farthest from side 16), the maximum width is defined by base width W, and the minimum width is defined by a plurality of inwardly bulging areas having decreased width W2. Therefore, the fifth flow passage 50 in first portion 90 will tend to have a more restricted flow than the other four flow passages 50 in first portion.

Similarly, there are six second fluid flow passages 56 in first portion 90 of heat exchanger 10, along the second surface 44 of intermediate plate 40. In the first five of these flow passages 56 (i.e. closest to side 16), the maximum width is defined by the base width W, and the minimum width is defined by a plurality of inwardly bulging areas having decreased width W2. In the sixth of these flow passages 56 (i.e. farthest from side 16), the minimum width is defined by base width W, and the maximum width is defined by a plurality of outwardly bulging areas having increased width W1. Therefore, the first five of the flow passages 56 will tend to have a more restricted flow than the sixth flow passage 56.

The first and second fluid flow passages 50, 56 in the second portion 92 of heat exchanger 10 also have a minimum width and a maximum width. In the present embodiment each of the fluid flow passages 50, 56 have a constant width throughout their lengths, which is equal to base width W. Therefore, the minimum width and maximum width in the fluid flow passages 50, 56 of the second portion 92 are the same. In the second portion 92 of heat exchanger 10, there are seven of the first fluid flow passages 50 and seven of the second fluid flow passages 56. Therefore, there are more of the first and second fluid flow passages 50, 56 in the second portion 92 of heat exchanger 10 than in the first portion 90.

From the above discussion, it can be seen that the minimum width of at least one of the first fluid flow passages 50 and at least one of the second fluid flow passages 56 in the first portion 90 of heat exchanger 10 is less than the minimum width of each of the first and second fluid flow passages 50, 56 in the second portion 92 of heat exchanger 10. In the illustrated embodiment, one of the five first fluid flow passages 50 and five of the six second fluid flow passages 56 have this feature.

Also, the minimum width of at least one of the second fluid flow passages 56 in the first portion 90 of heat exchanger 10 is greater than the minimum width of at least one of the first fluid flow passages 50 in the first portion 90 of heat exchanger 10. In the illustrated embodiment, this statement applies to four of the five first fluid flow passages and five of the six second fluid flow passages 56.

Where the second fluid port 84 is the inlet port, the fluid flowing through second fluid flow passages 56 is relatively cool. The areas of reduced width in the first five of the second fluid flow passages 56 of first portion 90 will tend to promote transverse distribution of the cool fluid throughout the second fluid manifold 80, to provide an improved fluid distribution throughout the area of heat exchanger 10.

The areas of minimum width and maximum width in the first and second fluid flow passages 50, 56 are defined by one or more flow restrictions. Each of the flow restrictions is defined by a narrowing in a width of one of the ridges 64, 66. For example, each of the flow restrictions in one of the first fluid flow passages 50 is defined by a narrowing in a width of one of the plurality of second ridges 66, these flow restrictions being identified by reference numeral 102. Also, each of the flow restrictions in one of the second fluid flow passages 56 is defined by a narrowing in a width of one of the plurality of first ridges 64, these flow restrictions being identified by reference numeral 104.

In heat exchanger 10, each of the flow restrictions 102, 104 comprises a localized area of one of the first and second fluid flow passages 50, 56, and each of the first and second fluid flow passages 50, 56 of the first portion 90 of heat exchanger 10 includes a plurality of the flow restrictions 102, 104 spaced apart in the longitudinal direction (y-axis). The arrangement of these multiple flow restrictions 102, 104 produces narrowing and/or widening of the fluid flow passages 50, 56 in different areas of the heat exchanger 10. Due to the temperature differential in the fluid flowing through the first and second fluid flow passages 50, 56, the arrangement of the flow restrictions 102, 104 allows areas in which hot spots may form to have increased thermal contact with relatively cold fluid, while areas in which cold spots may form to have increased thermal contact with relatively warm fluid.

Another feature of heat exchanger 10 which improves fluid flow distribution and temperature uniformity is the number and the location of the at least one fluid flow opening 98 in the intermediate plate 40. In this regard, the heat exchanger 10 includes a plurality of fluid flow openings 98, labeled 98A, 98B, 98C.

The fluid flow opening 98A is also referred to herein as the "proximal fluid flow opening" because it is closest to the first portion 90 and to first side 16 of heat exchanger 10. The fluid flow opening 98C is also referred to as the "distal fluid flow opening" because it is farthest from the first portion 90 and from first side 16 of heat exchanger 10. It can be seen that the area of the proximal fluid flow opening 98A is less than the area of the distal fluid flow opening 98C. In the present embodiment, the proximal opening 98A is a relatively small circular opening, while the distal opening 98C comprises an elongate, transversely-extending slot, wherein the slot has a circular enlargement at the end which is closest to second side 18 of heat exchanger 10.

The fluid flow opening 98B is also referred to herein as "intermediate opening", located between the proximal and distal openings 98A and 98C. The intermediate opening 98B has an area which is greater than that of proximal opening 98A, and less than that of distal opening 98C, and has a circular shape. It will be appreciated that the heat exchanger 10 may comprise more than one intermediate opening 98B which may be of the same or different shape, size and area.

The number, shape and location of the individual fluid flow openings 98A, 98B and 98C etc. is variable, and the at least one fluid flow opening 98 may comprise one, two, three, or greater than three individual openings which are located exclusively or primarily in the second portion 92 of heat exchanger 10. However, it will be appreciated that the at least one fluid flow opening 92 may include one or more individual openings in the first portion 90 of heat exchanger 10, the combined area of such openings in the first portion 90 being less than the combined area of the openings in the second portion.

Due to the locations and the areas of the individual openings 98A, 98B, 98C making up the at least one fluid flow opening 98 in heat exchanger 10, the fluid within the third and fourth fluid manifolds 94, 96 will tend to be distributed toward the second portion 92 and second side 18 of heat exchanger 10. This fluid distribution away from the first portion 90 containing the fluid ports 82, 84 will tend to improve the overall fluid distribution throughout the area of heat exchanger 10, thereby improving temperature distribution across the central areas 26, 36 of first and second outer plates 20, 30, and improving temperature distribution within the array of battery cells 2 in thermal contact with the outer surfaces 24 and/or 34 of the first and second outer plates 20, 30.

In this way, fluid flow can be controlled by the location and number of fluid flow openings 98. In some embodiments, the intermediate plate 40 forms a barrier between the third fluid manifold 94 and the fourth fluid manifold 96 except for fluid flow openings 98. Put in another way, the only fluid flow passages between the third fluid manifold 94 and fourth fluid manifold 96 are the fluid flow openings 98. In some embodiments, the only flow fluid flow passages between the first fluid flow passages 50 and second fluid flow passages 56 are the fluid flow openings 98.

In embodiments where the only flow fluid flow passages between the first fluid flow passages 50 and second fluid flow passages 56 are the fluid flow openings 98, there are no fluid flow openings in the intermediate plate 40 except for the fluid flow openings 98. For example, in these embodiments, the first fluid manifold 78 and second fluid manifold 80 are not connected by fluid flow openings. Therefore, in embodiments where the first fluid manifold 78 is connected to an inlet, the fluid must flow from the inlet through the first fluid manifold 78, into the first fluid flow passages 50, then into the third fluid manifold 94, through the fluid openings 98, into the fourth fluid manifold 96, then into the second fluid flow passages 56, then the second fluid manifold 80, and finally into an outlet.

The heat exchanger 10 may also include flow-directing ribs 106, 108 in one or both of the first and second outer plates 20, 30. In the present embodiment, both flow-directing ribs 106, 108 are formed in the intermediate plate 40 and are located in the respective first and second fluid manifolds 78, 80, and in the first portion 90 of heat exchanger 10. The first flow-directing rib 106 is located in the first fluid manifold 78, between the first fluid port 82 and the first ends 52 of the first fluid flow passages 50, while the second flow-directing rib is located in the second fluid manifold 80, between the second fluid port 84 and the second ends 60 of the second fluid flow passages 56.

The flow-directing ribs 106, 108 are at least partially and generally transversely directed (along x-axis). As a result, the flow-directing ribs 106, 108 are adapted to partly block direct fluid flow (along y-axis) between the fluid ports 82, 84 and the fluid flow passages 50, 56, causing the fluid to be directed transversely toward the second portion 92 of heat exchanger 10, on its way to or from the fluid ports 82, 84.

Each flow-directing rib 106, 108 has a height (along z-axis) which is less than or equal to the height of fluid manifolds 78, 80. The first flow-directing rib 106 protrudes from the first surface 42 of the intermediate plate 40, toward the inner surface 22 of the first outer plate 20. The second flow-directing rib 108 protrudes from the second surface 44 of intermediate plate 40, toward the inner surface 32 of second outer plate 30. In the present embodiment, the flow-directing ribs 106, 108 have the same height as fluid manifolds 78, 80, such that the flow directing ribs 106, 108 are in engagement with, and optionally metallurgically bonded to, the inner surfaces 22, 32 of the respective first and second outer plates 20, 30.

Rather than being provided in the intermediate plate 40, it will be appreciated that the flow-directing ribs 106, 108 may be formed in the central portions 26, 36 of the first and second outer plates 20, 30. However, rather than being integrally formed in the plates 20, 30 or 40, it will be appreciated that the flow-directing ribs 106, 108 may be in the form of inserts which are inserted into the fluid manifolds 78, 80 during manufacture of heat exchanger 10. Furthermore, it will be appreciated that the flow-directing ribs 106, 108 are not necessarily curved, but may rather be straight ribs extending substantially in the transverse direction.

Figure 9:
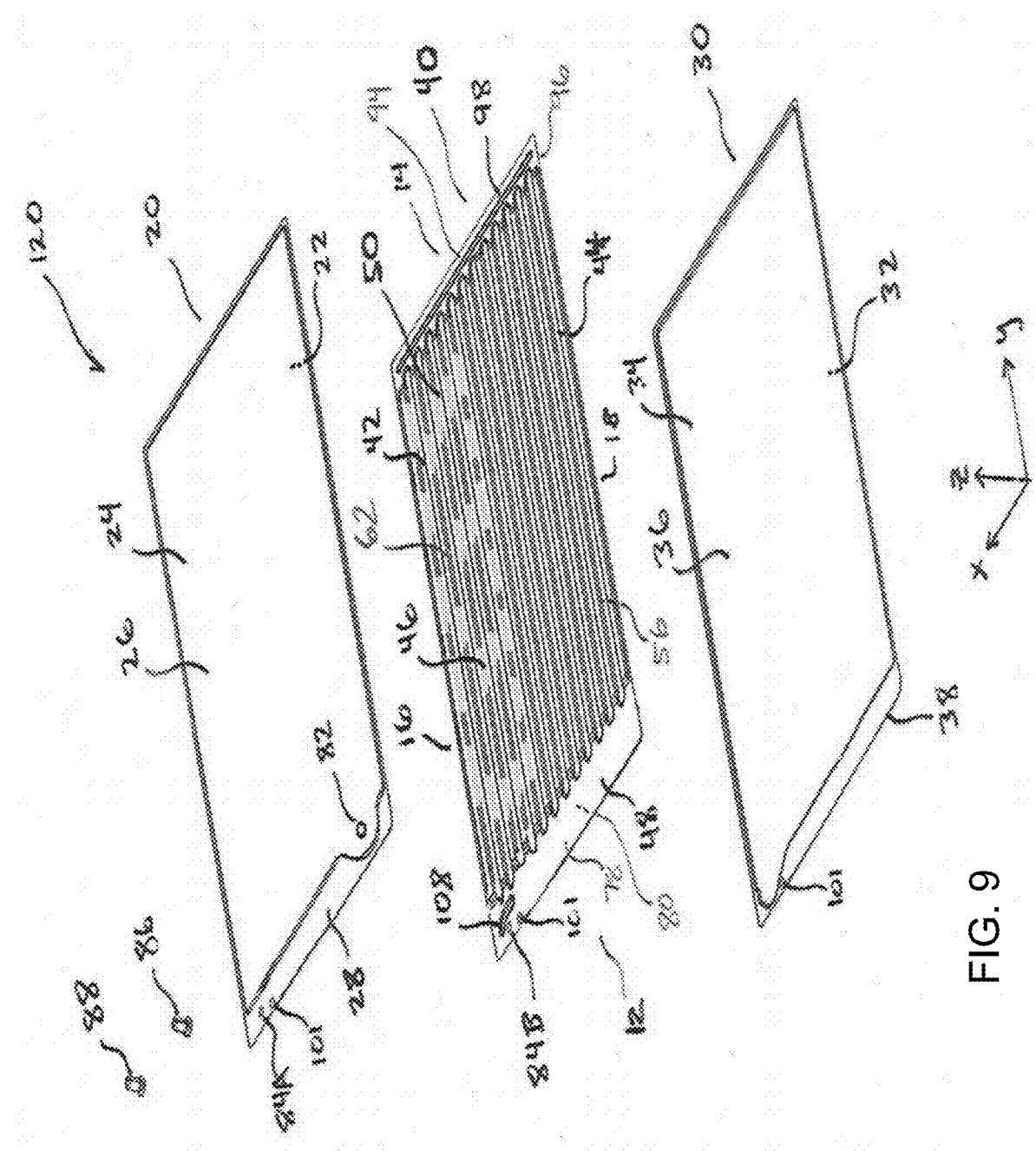
FIG. 9 is an exploded view of a heat exchanger according to a second embodiment.

Although heat exchanger 10 has both fluid ports 82, 84 located in the first portion 90 of heat exchanger 10, it will be appreciated that this is not essential in all embodiments. For example, in other embodiments, one of the fluid ports 82, 84 may be located proximate to first side 16 and the other being located proximate to second side 18, with both ports 82, 84 being located proximate to the first end 12. Such a heat exchanger 120 is illustrated in the exploded view of FIG. 9. Heat exchanger 120 shares a number of common elements with heat exchanger 10, and these like elements are identified with like reference numerals.

Heat exchanger 120 includes first and second fluid ports 82, 84 located proximate to the first end 12 of heat exchanger 120, and with the fluid ports 82, 84 located proximate to opposite sides 16, 18. The fluid port 82 is provided in the central area 26 of first outer plate 20, and is in flow communication with the first manifold 78. Although not shown in FIG. 9, a flow directing rib 106 may be provided in the intermediate plate 40, the rib 106 being located inside first manifold 78 between first fluid port 82 and first flow passages 50. It will be appreciated that the first, second, third and fourth fluid manifolds 78, 80, 94 and 96 of heat exchanger 120 are located entirely inside the plate structure defined by the three plates 20, 30, 40.

Heat exchanger 120 also differs from heat exchanger 10 in that the at least one fluid opening 98 between the third and fourth fluid manifolds 94, 96 is a single, continuous transverse slot extending from proximate to the first side 16 to proximate to the second side 18. In addition, the corrugations 62 of the intermediate plate 40 are straight and of continuous width, lacking the flow restrictions of heat exchanger 10. However, it will be appreciated that at least some of the corrugations 62 may be provided with flow restrictions identical or similar to the flow restrictions 102, 104 of heat exchanger 10, in any of the fluid flow passages 50, 56.

The above-described heat exchangers 10 and 120 are "cold plates" in which the outer surface 24 of first outer plate 20 and/or the outer surface 34 of the second outer plate 30 provide(s) a flat surface which is in thermal contact with an array of battery cells 2, and on which the battery cells 2 may be supported, wherein the battery cells 2 may be cylindrical or prismatic. Alternatively, heat exchangers 10 and 120 may be "ICE plates" in which one or both of the outer surfaces 24, 34 are in thermal contact with one or more battery cells, which may comprise pouch cells.

Heat exchangers 10 and 120 may be used to heat and/or cool battery cells 2, depending on the relative temperature of the heat transfer fluid supplied to heat exchangers 10 and 120, and the temperatures of the battery cells 2. Under normal operating conditions, the heat transfer fluid is a coolant which cools the battery cells 2. However, under cold operating conditions and/or at start-up under cold conditions, heat exchangers 10 and 120 may be supplied with a relatively warm heat transfer fluid which transfers heat to the battery cells 2, to bring them to an optimal operating temperature range. The heat transfer fluid may be heated remotely or heat exchangers 10 and 120 may be provided with an integral heating element, for example as disclosed in commonly assigned International Patent Application Nos. PCT/CA2019/050283 and PCT/CA2019/050744, the contents of which are incorporated herein by reference in their entireties.

Although heat exchangers 10 and 120 are described herein as heat exchangers for thermal modulation of battery cells 2, it will be appreciated that heat exchangers 10 and 120 may instead be used for thermal modulation of other heat-generating electronic components, such as power electronics devices for a vehicle. Such power electronics devices include transistors, resistors, capacitors, field-effect transistors (FETs), isolated gate bipolar transistors (IGBTs), power inverters, DC to DC converters and DC to DC converters.

In this way, the manifolds, fluid flow passages, widths of the fluid flow passages, and other features of the heat exchanger have the technical effect of improving heat distribution within the heat exchanger.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

It will be appreciated that the configurations and routines disclosed herein are exemplary in nature, and that these specific examples are not to be considered in a limiting sense, because numerous variations are possible. For example, the above technology can be applied to heat exchangers for other applications such as internal combustion engines, power generation, or electronics. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat exchanger, comprising:
an intermediate plate positioned between a first outer plate and a second outer plate;
first fluid flow passages formed between the first outer plate and a first side of the intermediate plate;
second fluid flow passages formed between the second outer plate and a second side of the intermediate plate;
a first fluid manifold formed between the first outer plate and the first side of the intermediate plate, and the first fluid manifold positioned at a first end of the first fluid flow passages;
a second fluid manifold formed between the second outer plate and the second side of the intermediate plate, and the second fluid manifold positioned at a second end of the second fluid flow passages; and
the first fluid manifold and the second fluid manifold positioned on a first end of the heat exchanger, the first fluid manifold and the second fluid manifold located entirely inside of a plate structure defined by the first outer plate, the second outer plate, and the intermediate plate,
wherein a width of the first fluid flow passages and a width of the second fluid flow passages varies along a length of the heat exchanger in a first region of the heat exchanger, and
wherein the width of the first fluid flow passages and the width of the second fluid flow passages is substantially constant along the length of the heat exchanger in a second region of the heat exchanger.

2. The heat exchanger of claim 1, wherein fluid flows from the first end of the heat exchanger, to a second end of the heat exchanger, and back to the first end of the heat exchanger.

3. The heat exchanger of claim 2, wherein fluid flows from the first fluid manifold into the first fluid flow passages, from the first fluid flow passages into the second fluid flow passages, and from the second fluid flow passages into the second fluid manifold.

4. The heat exchanger of claim 1, wherein a first port is connected to the first fluid manifold and a second port is connected to the second fluid manifold.

5. The heat exchanger of claim 4, wherein each of the first and second sides of the intermediate plate comprise a flange which engages with a respective flange on the first and second outer plates.

6. The heat exchanger of claim 1, wherein fluid flows from the first fluid manifold into the first fluid flow passages, from the first fluid flow passages into a third fluid manifold, from the third fluid manifold into a fourth fluid manifold, from the fourth fluid manifold into the second fluid flow passages, and from the second fluid flow passages into the second fluid manifold.

7. A heat exchanger, comprising:
an intermediate plate positioned between a first outer plate and a second outer plate;
first fluid flow passages formed between the first outer plate and a first side of the intermediate plate;
second fluid flow passages formed between the second outer plate and a second side of the intermediate plate;
a first fluid manifold formed between the first outer plate and the first side of the intermediate plate, and the first fluid manifold positioned at first end of the first fluid flow passages at a first longitudinal end of the heat exchanger;
a second fluid manifold formed between the second outer plate and the second side of the intermediate plate, and the second fluid manifold positioned at a second end of the second fluid flow passages at the first longitudinal end of the heat exchanger, the first fluid manifold and the second fluid manifold located entirely inside of a plate structure defined by the first outer plate, the second outer plate, and the intermediate plate; and
fluid flows from the first end of the first fluid flow passages to a second end of the first fluid flow passages, and fluid flows from a first end of the second fluid flow passages to the second end of the second fluid flow passages,
wherein a width of the first fluid flow passages and a width of the second fluid flow passages varies along a length of the heat exchanger in a first region of the heat exchanger, and
wherein the width of the first fluid flow passages and the width of the second fluid flow passages is substantially constant along the length of the heat exchanger in a second region of the heat exchanger.

8. The heat exchanger of claim 7, wherein a third fluid manifold is positioned at the second end of the first fluid flow passages and a fourth fluid manifold is positioned at the first end of the second fluid flow passages; and
openings pass through the intermediate plate to connect the third and fourth fluid manifold.

9. The heat exchanger of claim 7, wherein ridges on each of the first and second side of the intermediate plate form the first and second fluid flow passages.

10. The heat exchanger of claim 7, wherein flow restrictions are positioned within each of the first and second fluid flow passages.

11. The heat exchanger of claim 7, wherein longitudinal ridges on each of the first and second side of the intermediate plate form the first and second fluid flow passages, and
flow restrictions extending transverse to the longitudinal ridges are positioned within each of the first and second fluid flow passages.

12. The heat exchanger of claim 7, wherein a port is positioned in each of the first and second fluid manifold on a first transverse side of the heat exchanger, and
flow restrictions are positioned within one or more of the first and second fluid flow passages on the first transverse side of the heat exchanger.

13. The heat exchanger of claim 7, wherein fluid flows from the first fluid manifold into the first fluid flow passages, from the first fluid flow passages into a third fluid manifold, from the third fluid manifold through openings in the intermediate plate into a fourth fluid manifold, from the fourth fluid manifold into the second fluid flow passages, and from the second fluid flow passages into the second fluid manifold.

14. A heat exchanger, comprising:
an intermediate plate positioned between a first outer plate and a second outer plate;
first fluid flow passages formed between the first outer plate and a first side of the intermediate plate;
second fluid flow passages formed between the second outer plate and a second side of the intermediate plate;
a first fluid manifold formed between the first outer plate and the first side of the intermediate plate, and the first fluid manifold positioned at first end of the first fluid flow passages at a first longitudinal end of the heat exchanger;
a second fluid manifold formed between the second outer plate and the second side of the intermediate plate, and the second fluid manifold positioned at a second end of the second fluid flow passages at the first longitudinal end of the heat exchanger, the first fluid manifold and the second fluid manifold located entirely inside of a plate structure defined by the first outer plate, the second outer plate, and the intermediate plate; and a flange on each of the first and second sides of the intermediate plate engage with a respective flange on each of the first and second outer plates, wherein a width of the first fluid flow passages and a width of the second fluid flow passages varies along a length of the heat exchanger in a first region of the heat exchanger, and wherein the width of the first fluid flow passages and the width of the second fluid flow passages is substantially constant along the length of the heat exchanger in a second region of the heat exchanger.

15. The heat exchanger of claim 14, wherein flow-directing ribs are positioned in each of the first and second fluid manifolds.

16. The heat exchanger of claim 14, wherein flow-directing ribs and ports are positioned in each of the first and second fluid manifolds, and the flow-directing ribs are positioned between one of the ports and one of the first or second fluid flow passages.

17. The heat exchanger of claim 14, wherein one or more of the first or second fluid flow passages have an area of increased width and a flow restriction.

18. The heat exchanger of claim 14, wherein longitudinal ridges extend from the first fluid manifold to a third fluid manifold and from the second fluid manifold to a fourth fluid manifold.

19. The heat exchanger of claim 14, wherein fluid flows from a first port into the first fluid manifold, from the first fluid manifold into the first fluid flow passages, from the first fluid flow passages into a third fluid manifold, from the third fluid manifold through openings in the intermediate plate into a fourth fluid manifold, from the fourth fluid manifold into the second fluid flow passages, from the second fluid flow passages into the second fluid manifold, and from the second fluid manifold into a second port.

20. The heat exchanger of claim 14, wherein the first and second fluid flow passages are formed in the intermediate plate in an alternating relationship such that each of the first fluid flow passages is disposed adjacent to one of the second fluid flow passages.

* * * * *